United States Patent
Groussard et al.

(10) Patent No.: US 10,416,688 B2
(45) Date of Patent: Sep. 17, 2019

(54) METHOD FOR MONITORING PRESSURE INCLUDING BOIL DETECTION

(71) Applicants: CONTINENTAL AUTOMOTIVE FRANCE, Toulouse (FR);
CONTINENTAL AUTOMOTIVE GMBH, Hannover (DE)

(72) Inventors: Aurelien Groussard, Toulouse (FR); Thierry Collet, Fontenilles (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/566,615

(22) PCT Filed: Apr. 12, 2016

(86) PCT No.: PCT/EP2016/000601
§ 371 (c)(1),
(2) Date: Oct. 13, 2017

(87) PCT Pub. No.: WO2016/165821
PCT Pub. Date: Oct. 20, 2016

(65) Prior Publication Data
US 2018/0088603 A1    Mar. 29, 2018

(30) Foreign Application Priority Data
Apr. 14, 2015 (FR) ...................... 15 53257

(51) Int. Cl.
*F02M 33/02* (2006.01)
*G05D 16/02* (2006.01)
(Continued)

(52) U.S. Cl.
CPC ............ *G05D 16/02* (2013.01); *B60K 15/03* (2013.01); *B60K 15/03519* (2013.01);
(Continued)

(58) Field of Classification Search
CPC ........ B60K 15/03519; B60K 15/03504; F02M 25/08; F02M 37/0076; F02M 37/0082;
(Continued)

(56) References Cited

U.S. PATENT DOCUMENTS

2011/0265768 A1* 11/2011 Kerns ................... F02M 25/08
123/521
2011/0295482 A1* 12/2011 Pearce ............. B60K 15/03504
701/102
(Continued)

FOREIGN PATENT DOCUMENTS

CN        104176262 A      12/2014
DE        199 13 440 A1    10/2000
(Continued)

OTHER PUBLICATIONS

International Search Report, dated Jun. 22, 2016, from corresponding PCT application No. PCT/EP2016/000601.

*Primary Examiner* — Hai H Huynh
*Assistant Examiner* — Gonzalo Laguarda
(74) *Attorney, Agent, or Firm* — Young & Thompson

(57) ABSTRACT

Disclosed is a method for monitoring pressure, for a vessel assembly including a sealed vessel capable of holding a liquid, a filter capable of capturing vapors from the liquid, a pipe connecting the vessel to the filter, and an isolation valve arranged to selectively shut off the pipe, including a detection of the boiling of the liquid contained in the vessel.

18 Claims, 3 Drawing Sheets

(51) Int. Cl.
  *B60K 15/03* (2006.01)
  *B60K 15/035* (2006.01)
  *F02M 25/08* (2006.01)
  *F17C 13/00* (2006.01)
  *F17C 13/02* (2006.01)
  *F17C 13/04* (2006.01)
  *G01L 19/08* (2006.01)

(52) U.S. Cl.
  CPC ....... *F02M 25/0836* (2013.01); *F17C 13/002* (2013.01); *F17C 13/025* (2013.01); *F17C 13/04* (2013.01); *G01L 19/083* (2013.01); *B60K 2015/0321* (2013.01); *B60K 2015/03302* (2013.01); *B60K 2015/03514* (2013.01); *F17C 2205/0323* (2013.01); *F17C 2205/0341* (2013.01); *F17C 2205/0388* (2013.01); *F17C 2250/032* (2013.01); *F17C 2250/036* (2013.01); *F17C 2250/0434* (2013.01); *F17C 2250/0689* (2013.01); *F17C 2270/0168* (2013.01)

(58) Field of Classification Search
  CPC ........... F02M 25/0818; F02M 25/0836; F02M 2025/0845; G05D 16/02; F17C 13/002; F17C 13/025; F17C 13/04; F01L 19/083; F02D 2200/0602; F02D 2200/0606
  USPC .............. 123/516, 520, 522, 523; 73/114.38, 73/114.39, 114.43
  See application file for complete search history.

(56) References Cited

U.S. PATENT DOCUMENTS

| | | |
|---|---|---|
| 2012/0179354 A1 | 7/2012 | Hagen et al. |
| 2016/0115907 A1* | 4/2016 | Hagen .............. B60K 15/03519 137/544 |
| 2016/0265480 A1* | 9/2016 | Fukui ................. F02M 25/0809 |

FOREIGN PATENT DOCUMENTS

| | | |
|---|---|---|
| EP | 2 468 556 A2 | 6/2012 |
| JP | H11223152 A | 8/1999 |

* cited by examiner

METHOD FOR MONITORING PRESSURE INCLUDING BOIL DETECTION

BACKGROUND OF THE INVENTION

Field of the Invention

The present invention relates to sealed tanks for liquid, such as those used to store liquid fuel in vehicles, and more particularly to the problems associated with controlling the pressure inside such a tank.

Description of the Related Art

In order not to damage such a tank, the pressure therein needs to be kept below a maximum limit (over)pressure, but also above a minimum limit (vacuum) pressure.

The pressure inside a tank is dependent on the quantity of liquid added, typically by filling of the tank, or removed, typically by withdrawal, for example intended for the engine in the case of a fuel, but also dependent on the environmental conditions: atmospheric pressure and temperature. One difficulty associated with the temperature is that it is experienced, without the ability to control it, with amplitudes that may be very great. Thus, a vehicle, for example, may find itself subjected to very low temperatures in the depths of winter, or even to very high temperatures in full sun in the summer.

In the early days of combustion engines and motor cars, pressure control was solved passively by means of venting to the open air, possibly through at least one valve rated at the maximum limit pressure and/or at the minimum limit pressure. Thus, a tank was sealed against liquids, in order to hold its liquid contents, but open or able to be opened to vent to the open air, allowing gases to pass. In the case of vacuum pressure, air could be admitted into the tank from outside, and, in the event of overpressure, gas could escape from the tank to the outside so as, in both instances, to reestablish an acceptable pressure: comprised between the two limit pressures.

Such a gas, laden with vapor from the liquid, in the case of a volatile liquid, in the case of a fuel constitutes a contaminant, and these days it is no longer possible, under the regulations, to outgas freely into the environment.

So, at the present time, tanks are sealed both against liquids and against gases. It is possible, under certain conditions, to reduce the pressure by collecting the vapor by means of a filter, also referred to as a canister. This filter can then be regenerated, by emptying the captured vapor to the engine where it can be burnt.

This entails active control over the pressure in the tank, so as to avoid any risk of damaging the tank, while at the same time managing the level of filling of the filter, notably according to the phases of operation of the engine.

Document DE 199 13 440 A1 for example is known and relates to a fuel tank designed for a maximum pressure higher than atmospheric pressure. Each connecting hose/valve between the fuel tank and atmospheric pressure can be closed. During the operation of the internal combustion engine, the mechanical/electric tank ventilation valve defines a pressure in the tank, which is higher than atmospheric pressure but which does not considerably exceed the pressure maximum. The electrically operated valve is opened by an electronic control unit when the operating pressure exceeds a defined limit pressure value which is higher than atmospheric pressure but not higher than the pressure maximum.

In this context of pressure control, it would seem particularly advantageous to detect potential boiling of the liquid contained in the tank. Indeed, a boiling situation leads to a drastic increase in the quantities of vapor produced by the liquid, accompanied by an accelerated rise in pressure.

BRIEF SUMMARY OF THE INVENTION

The invention relates to a method of controlling pressure, for a tank assembly comprising a sealed tank able to contain a liquid, a filter able to capture vapors emanating from the liquid, a pipe connecting the tank to the filter and an isolation valve arranged in such a way as to selectively shut off the pipe, said method comprising detection of boiling of the liquid contained in the tank, where detection of boiling comprises the following steps:
  opening of the isolation valve for a given duration of opening, measurement of an initial pressure in the tank before the opening of the isolation valve,
  measurement of a final pressure in the tank after closure of the isolation valve,
  estimation of a time-based derivative of the pressure by calculation of a variation in pressure with respect to the duration of opening,
  detection of boiling if the time-based derivative is above a threshold.

According to another feature, when boiling is detected, the method further comprises a step of emitting an alert for the attention of an operator and/or of a computer.

According to another feature, when boiling is detected, the method further comprises a step of closing the isolation valve and/or keeping it closed.

According to another feature, the isolation valve is kept closed by default.

According to another feature, the method further comprises the following steps:
  monitoring of the pressure in the tank,
  comparison of the pressure in the tank against a minimum limit pressure of the tank and against a maximum limit pressure of the tank,
  opening of the isolation valve if the pressure in the tank is below the minimum limit pressure of the tank or if the pressure in the tank is above the maximum limit pressure of the tank.

According to another feature, detection of boiling is performed regularly.

According to another feature, detection of boiling is performed when there is a demand to open the tank filling flap.

According to another feature, a demand to open the tank filling flap is authorized if the measured pressure in the tank is substantially equal to the external pressure, if not it is delayed.

BRIEF DESCRIPTION OF THE DRAWINGS

Further features, details and advantages of the invention will become more clearly apparent from the detailed description given hereinafter by way of indication in relation to the drawings in which.

DETAILED DESCRIPTION OF THE PREFERRED EMBODIMENTS

Figure 1:
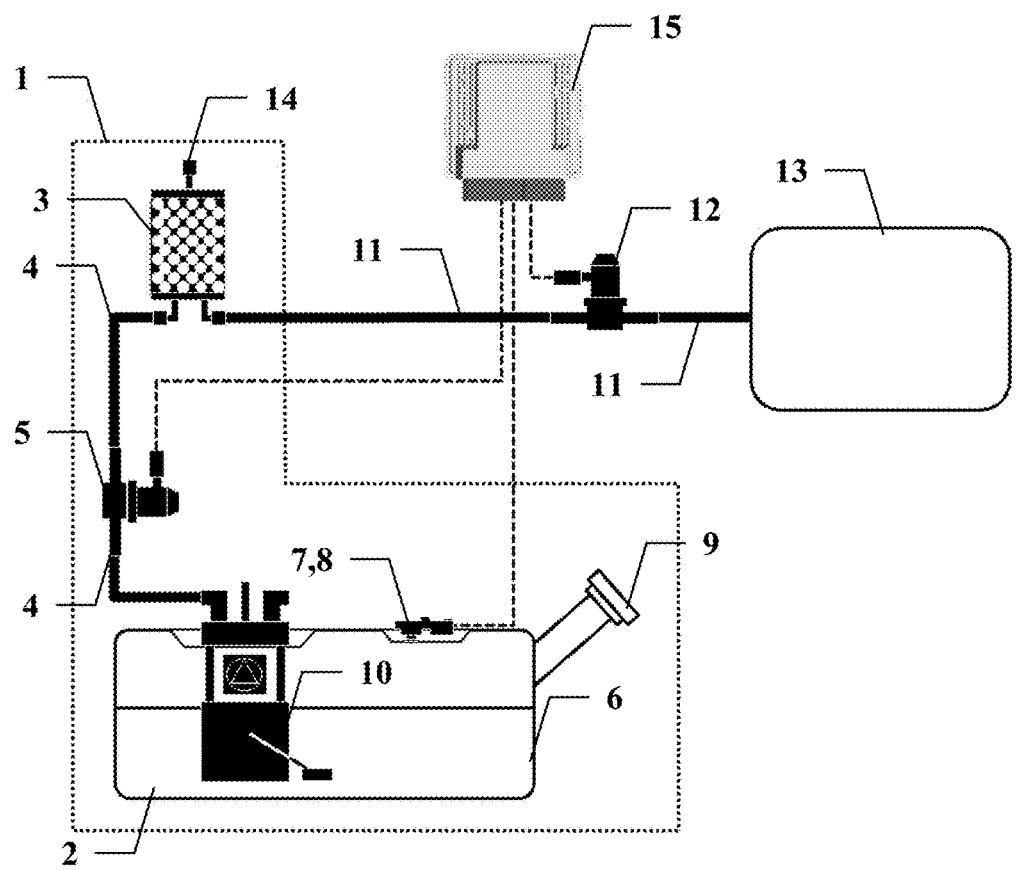
FIG. 1 depicts a general arrangement of a tank assembly in context.

FIG. 1 illustrates a tank assembly 1 of the type able to be pressure-controlled by a method according to the invention. This tank assembly 1 comprises a tank 2, a filter or canister 3, a pipe 4 and an isolation valve 5. The tank 2 is able to accept and contain a liquid 6. The tank 2 is sealed both against liquids and against gases. The liquid 6 may be a volatile liquid. So, the filter 3 is able to capture vapors emanating from the liquid 6. The pipe 4 is arranged in such a way as to connect the tank 2 to the filter 3 in a sealed manner, sealing both against liquids and against gases. The pipe 4 advantageously taps into the tank 2 near the top so as to avoid being connected to the liquid 6, but preferably to be connected to the vapor. The isolation valve 5 is arranged across the pipe 4 so as to shut it off selectively. Thus, the isolation valve 5 may be controlled, advantageously by an electrical control signal, to make it move into the closed position, in which the pipe 4 is shut off preventing any transfer between the tank 2 and the filter 3, or into the open position, in which the pipe 4 allows flow and allows transfer from the tank 2 to the filter 3 or vice versa.

The tank 2 may further comprise a filling flap 9 able to be opened or closed selectively so as to allow the tank 2 to be filled with liquid 6.

In one usage scenario, the tank assembly 1 is arranged in a motor vehicle and the liquid 6 is a volatile fuel.

The tank 2 may further comprise at least one outlet and a pipe (neither depicted) for withdrawing the liquid 6 allowing the liquid 6 to be withdrawn for sending to a consumer, such as an engine 13 for example in the case of a fuel.

The tank 2 may alternatively be equipped with a pump 10 for withdrawing the liquid 6.

The tank assembly 1 may even comprise, advantageously arranged on the tank 2, a pressure sensor 7 able to measure the pressure inside the tank 2. The tank assembly 1 may even comprise, advantageously arranged on the tank 2, a temperature sensor 8 able to measure the temperature inside the tank 2.

The various electronically interfaceable components (valves 5,12, sensors 7,8, etc.) are advantageously interfaced with at least one computer 15, such as an engine control unit 15 (or ECU). The electrical interfaces between the computer 15 and the components 5, 7, 8, 12 are featured in dashed lines.

The filter 3 comprises a first connection connecting it to the pipe 4. It also comprises a second connection connecting it to an air vent 14.

It is undesirable for the vapors emanating from the liquid 6 to be released into the atmosphere, for example because they are pollutants. So, the filter 3 has the function of capturing these vapors.

A low pressure or vacuum pressure, namely a pressure below atmospheric pressure, in the tank 2 may be increased by opening the isolation valve 5. Air, entering for example via the air vent of the filter 3, can then enter the tank 2.

Likewise, a high pressure or overpressure, namely a pressure higher than atmospheric pressure, in the tank 2 may be reduced by opening the isolation valve 5. Air, potentially laden with vapor emanating from the liquid 6, then leaves the tank 2 and heads toward the filter 3. The air escapes, via the air vent 14, while the vapor is captured by the filter 3.

The filter 3 contains a filtering material, for example active charcoal. As this filtering material gradually becomes laden with captured vapor, the capacity of the filter 3 decreases.

The capacity of the filter 3 may be regenerated. To do that, there is another pipe 11 between the filter 3 and a consumer 13 of vapor, thus allowing the filter 3 to be purged. This can be controlled by means of a purge valve 12 (such as a canister purge valve also known as a "canister purge solenoid" or CPS). In the case of a fuel, a consumer is, for example, an engine 13, advantageously capable of burning vapor.

In such an environment it is possible, under certain conditions, to control the purging/regeneration of the filter 3. It is also possible to estimate the capacity of the filter. This is the subject of other patent applications in the name of the applicant company.

With a view to controlling the pressure in the tank 2, it is highly advantageous to be able to detect boiling of the liquid 6. This is because boiling drastically alters the conditions under which vapor is released and, with them, the rate at which the pressure varies.

Under average temperature and pressure conditions, a liquid 6 is a body present chiefly in liquid phase.

In the absence of boiling, a vapor phase of said body may also be present. Liquid 6 may vaporize at the interface between the two phases, namely at the surface of the liquid 6. The phenomenon of vaporization in this case is an essentially surface phenomenon and leads to a moderate variation in pressure. As long as there is no boiling, the partial pressure or saturation vapor pressure remains below the pressure in the tank 2.

When the partial pressure increases until it becomes equal to the pressure in the tank 2, by definition, the boiling point is reached. At this stage, the partial pressure is able to displace the liquid and vapor, in the form of bubbles, forms throughout the volume of liquid. The phenomenon of vaporization, which previously had been a surface phenomenon, becomes a volumetric phenomenon. This results in a sudden increase in the rate of production of vapor, accompanied by a sharp increase in pressure.

Hence, it is highly advantageous to be able to detect boiling of the liquid 6, in the context of control of the pressure in the tank 2.

Figure 2:
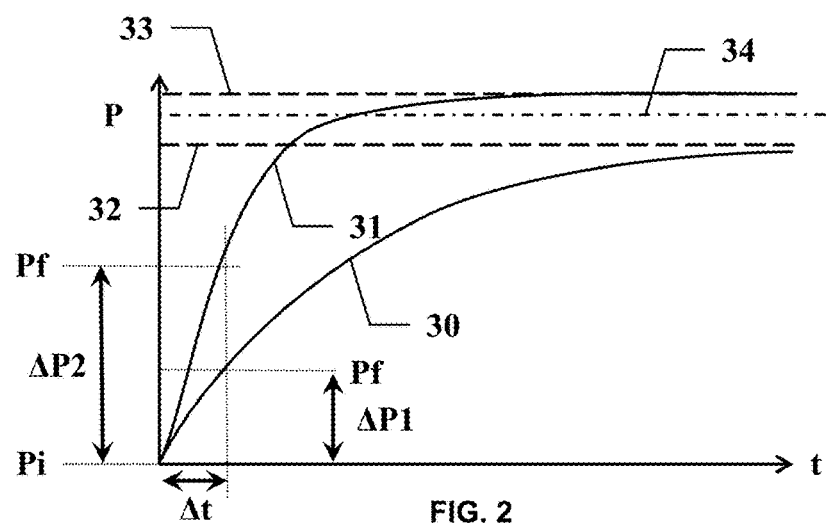
FIG. 2 depicts the change in pressure as a function of time and the principle of detecting boiling.

Based on the definition of the boiling point and on the consequences that boiling has on the variation in pressure, illustrated more particularly by FIG. 2, detection of boiling may be performed. FIG. 2 depicts a diagram featuring the pressure P on the ordinate axis, as a function of time t on the abscissa axis. This diagram shows a first curve 30 corresponding to an absence of boiling and a second curve 31 corresponding to a presence of boiling. This is within a constant volume as formed by the sealed tank 2.

It can be seen from the curve 30 that the partial pressure increases slowly up to an asymptotic equilibrium value 32 the value of which becomes established at below the value of the pressure 34 inside the tank 2.

On the other hand, with the curve 31, the partial pressure increases rapidly. It may potentially reach an asymptotic equilibrium value 33 the value of which exceeds the value of the pressure 34 inside the tank 2.

On the basis of this observation, it is possible to detect a boiling situation by observing the rate at which the partial pressure varies. The partial pressure contributes to the "total" pressure inside the tank 2 and these two parameters exhibit comparable variations. The "total" pressure inside the tank 2 can be measured, for example, by means of a pressure sensor 7 arranged on the tank 2.

Detection of boiling is performed by comparing the gradient or time-based derivative d of the pressure against a threshold S. If the time-based derivative d is above the threshold S, boiling is detected. If, on the other hand, the time-based derivative d is below or equal to the threshold S, no boiling is present.

The threshold S is a constant that is determined empirically. According to one embodiment, the time-based derivative d of the pressure is measured, upon an application of a variation in temperature, for a first set of samples under variable experimental conditions (different initial temperatures, liquid agitated or nonagitated, various types of liquid (variable RVP), etc.) but always in the absence of boiling, and a second set of samples under variable experimental conditions but this time in the presence of boiling. The threshold S is chosen so as to separate the two sets of samples.

The time-based derivative $d=dP/dt$ of the pressure is estimated by calculating a rate of variation $\Delta P/\Delta t$. The principle is to open the isolation valve 5 for a duration $\Delta t$ and to measure the corresponding variation in pressure $\Delta P$, $\Delta P1$, $\Delta P2$.

Figure 3:
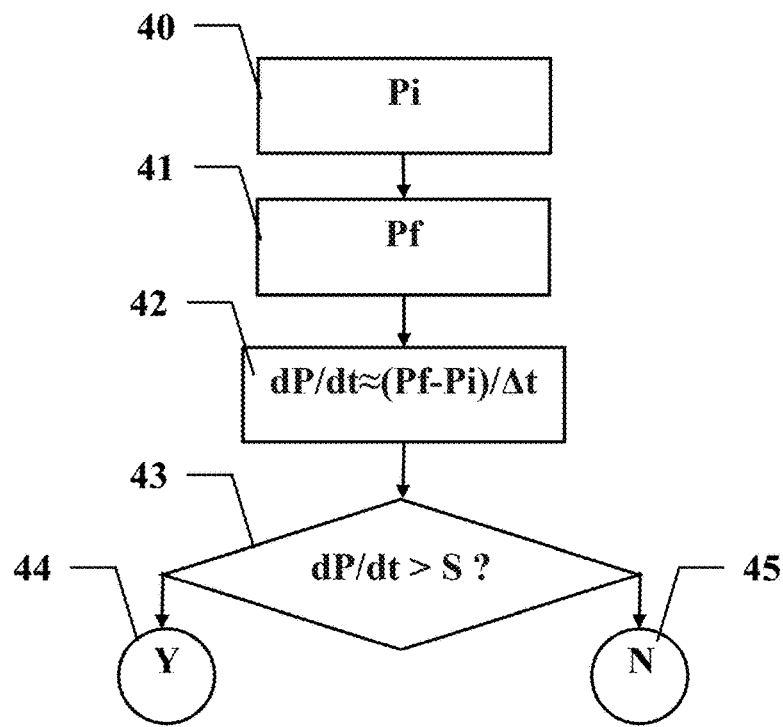
FIG. 3 is a flow diagram of the detection of boiling.

In order to do that, boiling detection can be achieved by performing the following steps, illustrated with reference to the flow diagram of FIG. 3. During a first step 40, an initial pressure Pi in the tank 2 is measured, then the isolation valve 5 is opened. The isolation valve 5 is kept open for a given duration of opening $\Delta t$. At the end of this duration of opening $\Delta t$, during a second step 41, the isolation valve 5 is closed then a final pressure Pf in the tank 2 is measured. A third step 42 calculates an estimate of the time-based derivative d of the pressure by relating the variation in pressure $\Delta P$, $\Delta P1$, $\Delta P2$ equal to the difference Pf−Pi between the final pressure Pf and the initial pressure Pi to the duration of opening $\Delta t$, namely $d=dP/dt=\Delta P/\Delta t=(Pf-Pi)/\Delta t$. During a fourth step 43, this estimate of the time-based derivative d is compared against a threshold S. If d is above the threshold S, which it is for $\Delta P2/\Delta t$, boiling is detected and the method continues at step 44. If d is below the threshold S, which it is for $\Delta P1/\Delta t$, an absence of boiling is observed and the method continues at step 45.

The duration of opening $\Delta t$ needs to be long enough for the variation in pressure $\Delta P$,$\Delta P1$,$\Delta P2$ to be significant, while at the same time being as short as possible. In practice, a duration of opening $\Delta t$ of between 1 and 10 seconds is satisfactory. A duration of opening $\Delta t$ of 2 seconds constitutes a good compromise.

When boiling is detected, an alert, indicating that boiling is occurring, is advantageously transmitted. A first destination may be an operator. Thus, in the case of an application to a vehicle, an alert is advantageously sent for the attention of the driver, for example by means of an indicator on the instrument panel. Another destination, as an alternative or in addition, may be at least one computer. Thus, in the case of an application to a vehicle, the computer, such as the ECU 15, is advantageously alerted.

A state of boiling, because of the presence of bubbles in the liquid/fuel 6, may prevent a start/restart or may disrupt the correct operation of the engine 13. This is why knowledge of a state of boiling is of use to the ECU 15.

Figure 6:
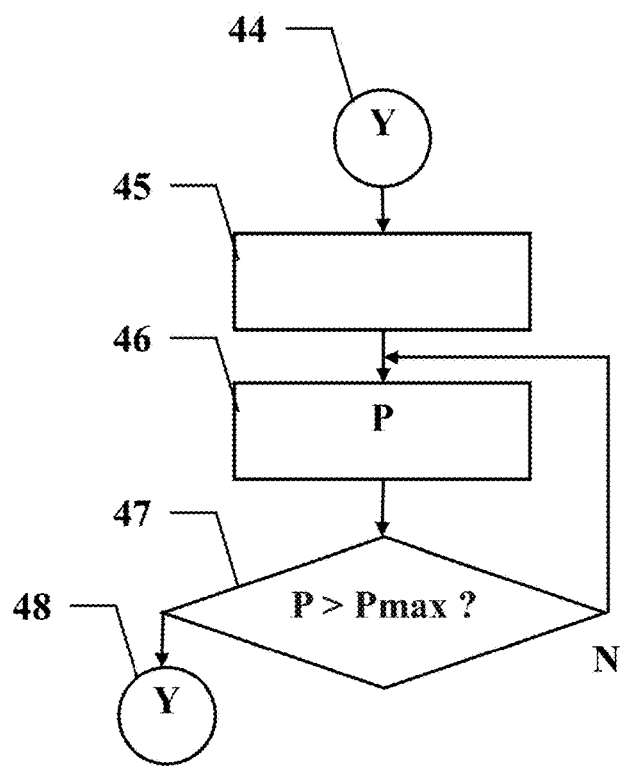
FIG. 6 is a flow diagram of the method following detection of boiling.

As illustrated by the flow diagram of FIG. 6, if it proves that the isolation valve 5 is open when a condition of boiling is detected, this valve needs to be closed. Coherently, if the isolation valve 5 is closed, every possible step needs to be taken to keep it closed. This is illustrated by a step 45 of closing or of keeping closed.

Specifically, a closed position of the isolation valve 5 may prove to be an effective corrective measure in the case of boiling, as will be described.

Figure 4:
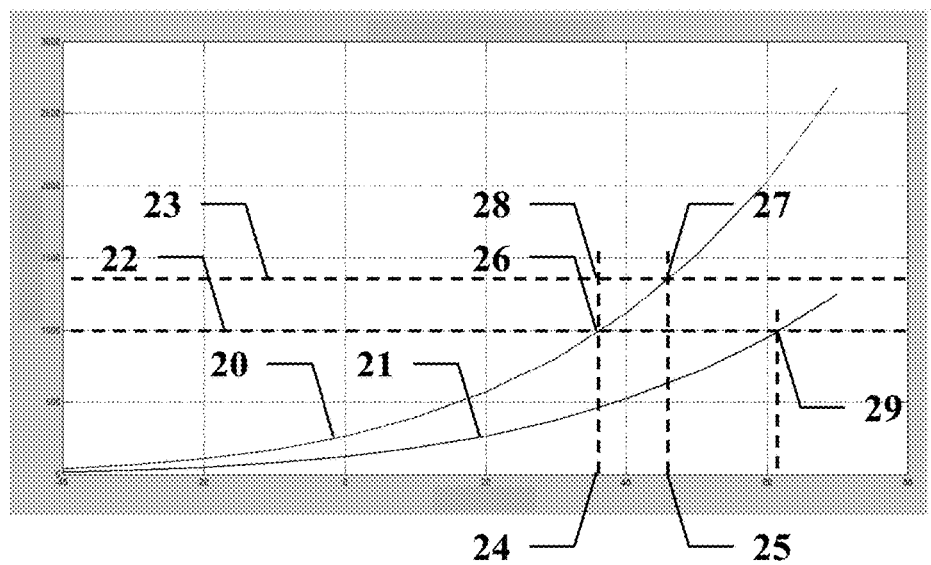
FIG. 4 illustrates the definition of boiling in a pressure/temperature diagram.

FIG. 4 shows a diagram of pressure (on the ordinate axis) against temperature (on the abscissa axis) depicting a first locus 20 of the boiling points for a first liquid. A liquid is boiling if the pressure/temperature operating point is situated below the curve 20. It is not boiling if the pressure/temperature operating point is situated above the curve 20. The second locus 21 is similar for a second liquid, which is not as volatile (which can reach a higher boiling temperature) than the first. By way of indication, the locus 20 may correspond to a "winter" fuel whereas the locus 21 may correspond to a "summer" fuel. A low pressure value 22 and a high pressure value 23 have also been featured. The low pressure value 22 is, for example, atmospheric pressure (1000.10-3 atm). The high pressure value 23 may be any value but it is assumed that it is lower than a maximum limit pressure Pmax that the tank 2 can withstand.

Considering a liquid 6 with characteristics as described by the locus 20, at the pressure 22, if its temperature reaches or exceeds a temperature value 24, this liquid 6 has an operating point 26, situated on the locus 20. The liquid 6 is therefore boiling. This results in a considerable release of vapor. If the isolation valve 5 is closed, the pressure in the tank containing the liquid 6 increases. The operating point therefore shifts toward the point 28 and in doing so moves above the locus 20: boiling is stopped. Another interpretation may be as follows. For a pressure 23, the boiling point on the locus 20 is the point 27, which corresponds to a temperature 25 higher than the temperature 24 of the liquid 6.

Figure 5:
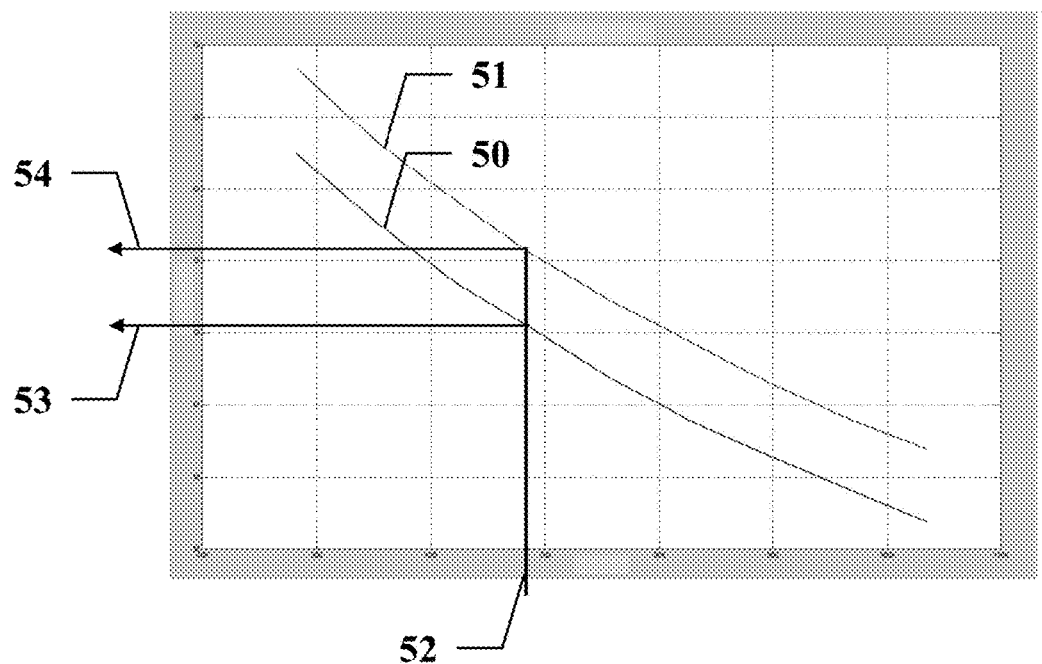
FIG. 5 is a graph indicating the boiling point temperature as a function of pressure.

This is visible again on the graph of FIG. 5 which is a diagram of temperature (on the ordinate axis) against RVP (on the abscissa axis). The RVP ("Reid Vapor Pressure") is an indicator characteristic of the volatility of a liquid 6, which is uniform at a pressure. The higher the RVP the more volatile the liquid and the lower the boiling temperature.

This diagram shows a first curve 50 corresponding to a first pressure and a second curve 51 corresponding to a second pressure, higher than the first pressure. At a given pressure, corresponding to a curve 50,51, a liquid 6 is boiling if its defining point (RVP,temperature) is above the curve 50,51 and is not boiling below the curve 50,51. This graph can be read as follows. For a liquid 6 defined by a given volatility 52, read off the abscissa axis (in this instance 690 hPa), the vertical straight line intersects the first curve 50, corresponding to a first pressure, at an ordinate-axis point 53, featuring the boiling point (here 51° C.) of this liquid 6 at said first pressure. For this same liquid 6, the vertical straight line intersects the second curve 51, corresponding to a second pressure, at an ordinate-axis point 54, featuring the boiling point (here 56° C.) of this liquid 6 at said second pressure. Since the boiling point 53,54 increases with the increase in pressure produced by the boiling, the effective temperature of the liquid 6 may drop back below the boiling point, so the liquid 6 stops boiling.

Thus, it would appear that confinement at constant volume, through the closing or keeping-closed of the isolation valve 5, may advantageously stop boiling, allowing a new pressure equilibrium to become established.

Detection of boiling advantageously leads to the closing of the isolation valve 5. However, there are other reasons leading to the closing of the isolation valve 5. The fact that the filter 3 has a limited capacity is one reason that encourages keeping the isolation valve 5 closed so as to control the times at which the filter 3 is used. The method for estimating the filling of the filter 3 also requires a controlled environment for the filter 3 and so also encourages keeping the isolation valve 5 closed. So, according to one embodiment, the isolation valve 5 is kept closed by default.

The pressure control method as illustrated in the flow diagram of FIG. 6 involves regularly, and whatever the state in relation to potential boiling, performing the following steps.

During a step 46, the pressure P in the tank 2 is measured, for example using a pressure sensor 7. This pressure P is compared, during step 47, against a minimum limit pressure Pmin of the tank 2 and against a maximum limit pressure Pmax of the tank 2.

If the pressure P is below the minimum limit pressure Pmin of the tank 2, the tank 2 is at a vacuum pressure and runs the risk of being damaged. So, during a step 48, it is appropriate to open the isolation valve 5. This allows for example air to enter the tank 2, for example via the air vent 14 of the filter 3, so as to allow the pressure P to increase again until it potentially reaches a value close to atmospheric pressure. This situation does not present much of a problem insofar as no emanation from the system is to be counter-indicated, and there is therefore no risk of contamination.

If the pressure P is above the maximum limit pressure Pmax of the tank 2, the tank 2 is at an overpressure and runs the risk of being damaged. So, it is appropriate during a step 48 to open the isolation valve 5. This allows air, possibly laden with vapor emanating from the liquid 6, to leave the tank 2. This is done through the filter 3 which allows the air to escape via its air vent 14 and which, within the limit of its capacity, captures the vapor. This allows the pressure P to drop until, if possible, a value close to atmospheric pressure is reached.

This situation may become problematical if the overpressure is maintained beyond the capacity of the filter 3. Here, the method favors safety, which entails lowering the pressure P, over a risk of vapor contamination. Damage to the tank 2 could lead to a rupture, giving rise to a leak that is even more consequential and involves liquid 6, which is even more damaging in terms of pollution. In order to limit this risk, it is appropriate ahead of time, as long as the pressure P is below the maximum limit pressure Pmax, to ensure that the filter 3 is purged as soon as possible.

If the pressure P is comprised between the minimum limit pressure Pmin and the maximum limit pressure Pmax the method may loop back typically to step 46 of measuring the pressure P.

The monitoring of the pressure of the tank 2 in relation to the minimum Pmin and maximum Pmax limit pressures, which is performed by steps 46-48, is advantageously performed regularly so as to ensure the integrity of the tank 2. However, such monitoring is of even greater benefit following a detection of boiling 44 since the boiling situation produces a great and rapid increase in pressure, and therefore a significant risk of reaching the maximum limit pressure Pmax.

In order to ensure good responsiveness, the detection of boiling may, according to a first embodiment, be performed regularly.

Alternatively, in order not to open the isolation valve 5 excessively, the detection of boiling may be performed upon the appearance of an event. A first event that might justify a suspicion of boiling is an appreciable variation in the pressure in the tank 2, for example detected by regular monitoring of the pressure.

Another type of event is a demand to open the tank 2 filling flap 9. Because the tank 2 is sealed, and may be subject to a pressure different from the atmospheric pressure outside the tank 2, the filling flap 9 needs to be locked. Thus, when an operator wishes to fill the tank 2, he makes an appropriate request to do so. This request is transmitted, in the form of a demand to open, to the system which either does or does not authorize an opening. If opening is authorized, an unlock command is actually sent to the flap 9, which can then be opened. This processing allows the system to perform certain checks or actions on the tank 2 before authorizing or not authorizing an opening. One of the prechecks is typically a detection of boiling insofar as boiling may significantly alter the conduct to be followed. One action prior to actuating an opening of the flap 9 is typically to attempt to place the inside of the tank at a pressure as close as possible to the pressure outside, namely conventionally atmospheric pressure.

The principle of processing a demand to open is that a request to open needs to be positively followed by an unlocking in most cases.

However, the system may delay actual opening in order to perform various checks and/or actions beforehand.

The system will typically attempt to balance the pressures between the inside and the outside of the tank 2 prior to opening. The system will advantageously perform a boiling detection. If such detection of boiling is positive, equilibrium between the pressures may prove tricky to achieve.

The system may then alert the operator to the state of boiling and/or to the state of differential pressure. There is a risk that hot liquid will be ejected from the flap 9 because of the state of boiling and/or the state of overpressure.

The system may even demand confirmation of the request to open from the operator thus informed.

The invention claimed is:

1. A method of controlling pressure, for a tank assembly including a sealed tank configured to contain a liquid, a filter configured to capture vapors emanating from the liquid, a pipe connecting the tank to the filter, and an isolation valve configured to selectively shut off the pipe, the method comprising:
   detecting boiling of the liquid contained in the tank by:
      measuring an initial pressure in the tank before opening of the isolation valve,
      after the measuring the initial pressure, opening the isolation valve for a specified duration of opening and then closing the isolation valve at an end of the specified duration of opening,
      measuring a final pressure in the tank after closure of the isolation valve,
      estimating a time-based derivative of the pressure by calculating a variation in pressure that is a difference between the measured final pressure and the measured initial pressure with respect to the duration of opening until the closure of the isolation valve, and
      detecting the boiling when the time-based derivative is above a threshold.

2. The method as claimed in claim 1, wherein, when boiling is detected, the method further comprises:
   emitting an alert for the attention of an operator and/or of a computer.

3. The method as claimed in claim 1, wherein, when boiling is detected, the method further comprises:
   keeping the isolation valve closed.

4. The method as claimed in claim 1, wherein the isolation valve is kept closed by default.

5. The method as claimed in claim 1, further comprising:
monitoring the pressure in the tank;
comparing the pressure in the tank against a minimum limit pressure of the tank and against a maximum limit pressure of the tank; and,
opening the isolation valve when the pressure in the tank is below the minimum limit pressure of the tank or when the pressure in the tank is above the maximum limit pressure of the tank.

6. The method as claimed in claim 1, wherein the detecting the boiling is performed more than one time.

7. The method as claimed in claim 1, wherein the detecting the boiling is performed when there is a demand to open a filling flap of the tank.

8. The method as claimed in claim 1, wherein a demand to open a filling flap of the tank is authorized when the measured pressure in the tank is substantially equal to the external pressure, and if the measured pressure is not equal to the external pressure, the demand to open the tank filling flap is delayed.

9. The method as claimed in claim 1, wherein the tank assembly is disposed in a motor vehicle and the liquid is a volatile fuel.

10. The method as claimed in claim 2, wherein when boiling is detected, the method further comprises:
keeping the isolation valve closed.

11. The method as claimed in claim 2, wherein the isolation valve is kept closed by default.

12. The method as claimed in claim 3, wherein the isolation valve is kept closed by default.

13. The method as claimed in claim 2, further comprising:
monitoring the pressure in the tank;
comparing the pressure in the tank against a minimum limit pressure of the tank and against a maximum limit pressure of the tank;
opening the isolation valve when the pressure in the tank is below the minimum limit pressure of the tank or when the pressure in the tank is above the maximum limit pressure of the tank.

14. The method as claimed in claim 3, further comprising:
monitoring the pressure in the tank;
comparing the pressure in the tank against a minimum limit pressure of the tank and against a maximum limit pressure of the tank;
opening the isolation valve when the pressure in the tank is below the minimum limit pressure of the tank or when the pressure in the tank is above the maximum limit pressure of the tank.

15. The method as claimed in claim 4, further comprising:
monitoring the pressure in the tank;
comparing the pressure in the tank against a minimum limit pressure of the tank and against a maximum limit pressure of the tank;
opening the isolation valve when the pressure in the tank is below the minimum limit pressure of the tank or when the pressure in the tank is above the maximum limit pressure of the tank.

16. The method as claimed in claim 2, wherein the detecting the boiling is performed more than one time.

17. The method as claimed in claim 3, wherein the detecting the boiling is performed more than one time.

18. The method as claimed in claim 4, wherein the detecting the boiling is performed more than one time.

* * * * *